US012712627B2

(12) United States Patent
Hong

(10) Patent No.: US 12,712,627 B2
(45) Date of Patent: Aug. 18, 2026

(54) RANDOM ACCESS METHOD, RANDOM ACCESS APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 714 days.

(21) Appl. No.: 18/001,494

(22) PCT Filed: Jun. 15, 2020

(86) PCT No.: PCT/CN2020/096172
§ 371 (c)(1),
(2) Date: Dec. 15, 2022

(87) PCT Pub. No.: WO2021/253178
PCT Pub. Date: Dec. 23, 2021

(65) Prior Publication Data
US 2023/0224974 A1 Jul. 13, 2023

(51) Int. Cl.
*H04B 7/185* (2006.01)
*H04W 74/0833* (2024.01)

(52) U.S. Cl.
CPC .... *H04B 7/18513* (2013.01); *H04W 74/0833* (2013.01)

(58) Field of Classification Search
CPC .............. H04B 7/1851; H04B 7/18513; H04B 7/18532; H04W 74/006; H04W 74/0833; H04W 74/0838; H04W 84/06
See application file for complete search history.

(56) References Cited

U.S. PATENT DOCUMENTS 10,869,338 B2 * 12/2020 Jung .................. H04W 74/002
2001/0012775 A1 * 8/2001 Modzelesky ......... H04W 12/06 455/430
2016/0323032 A1 11/2016 Ulupinar et al.
2016/0323800 A1 11/2016 Ulupinar et al.
2020/0052782 A1 * 2/2020 Wang ................. H04B 7/18541
2020/0068623 A1 * 2/2020 Yan ....................... H04L 5/0082
2020/0275477 A1 * 8/2020 Shah .................. H04W 74/004
(Continued)

FOREIGN PATENT DOCUMENTS

CN 108243391 A 7/2018
CN 109788548 A 5/2019
(Continued)

OTHER PUBLICATIONS

CATT: Initial Discussion for Idle and Inactive Mode in NTN, 3GPP Draft; R2-2006628; vol. RAN WG2, No. electronic; Aug. 17, 2020-Aug. 28, 2020; Aug. 7, 2020. (Year: 2020).*
(Continued)

*Primary Examiner* — Ayman A Abaza
(74) *Attorney, Agent, or Firm* — Oblon, McClelland, Maier & Neustadt, L.L.P.

(57) ABSTRACT

Aspects of the disclosure are directed to a random access method that can include determining first information that indicates a random access configuration of a satellite cell. The random access method can further include sending the first information.

12 Claims, 6 Drawing Sheets

(56) References Cited

U.S. PATENT DOCUMENTS

2020/0367284 A1* 11/2020 Lei .................... H04W 74/0841
2021/0075501 A1* 3/2021 Xu ........................ H04B 7/1853
2021/0329705 A1* 10/2021 Ljung ................... H04W 76/10
2021/0352738 A1* 11/2021 Bienas ..................... H04B 7/01
2022/0007267 A1* 1/2022 Maattanen .............. H04W 8/26
2022/0132593 A1* 4/2022 Ren .................... H04B 7/18504
2022/0217782 A1* 7/2022 Nishio ................. H04B 7/1851

FOREIGN PATENT DOCUMENTS

CN 110519861 A 11/2019
CN 110611949 A 12/2019
WO WO 2016/179037 A1 11/2016

OTHER PUBLICATIONS

International Search Report with English translation issued Mar. 11, 2021, in PCT/CN2020/096172, filed on Jun. 15, 2020, 6 pages.
Nokia et al., "Doppler Compensation, Uplink Timing Advance and Random Access in NTN", Nokia, Nokia Shanghai Bell, 3GPP TSG RAN WG1 #99 R1-1913017, Nov. 18-22, 2019, 28 pages.

* cited by examiner

RANDOM ACCESS METHOD, RANDOM ACCESS APPARATUS, AND STORAGE MEDIUM

CROSS-REFERENCE TO RELATED APPLICATION

This application is the U.S. national phase application of International Application No. PCT/CN2020/096172, filed on Jun. 15, 2020, the disclosure of which is incorporated herein by reference in its entirety for all purposes.

BACKGROUND OF THE INVENTION

Field of the Invention

The present disclosure relates to the field of communication technologies, and in particular, to a random access method, a random access apparatus, and a storage medium.

Description of the Related Art

With a 5G standardization process continues to evolve and 5G networks are rapidly deployed, next-generation communication technologies, such as 6G technologies, have been researched in this field. A space-sky-ground-sea integration is an important 6G technology.

In related arts, a satellite network may provide wider coverage for achieving the space-sky-ground-sea integration due to a mobility of a communication satellite. However, how a satellite terminal accesses the communication satellite for communication is a focus to be worked on.

SUMMARY OF THE INVENTION

In view of the above, the present disclosure provides a random access method, a random access apparatus and a storage medium.

According to a first aspect of the present disclosure, a random access method is provided and includes determining first information that indicates a random access configuration of a satellite cell; and sending the first information.

According to a second aspect of the present disclosure, a random access method is provided and includes receiving first information that indicates a random access configuration of a satellite cell, and accessing the satellite cell based on the random access configuration.

According to a third aspect of the present disclosure, a random access method is provided and includes determining an association relationship between a random access configuration of a satellite cell and a location of the satellite cell; and sending the association relationship.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE PREFERRED EMBODIMENTS

Figure 1:
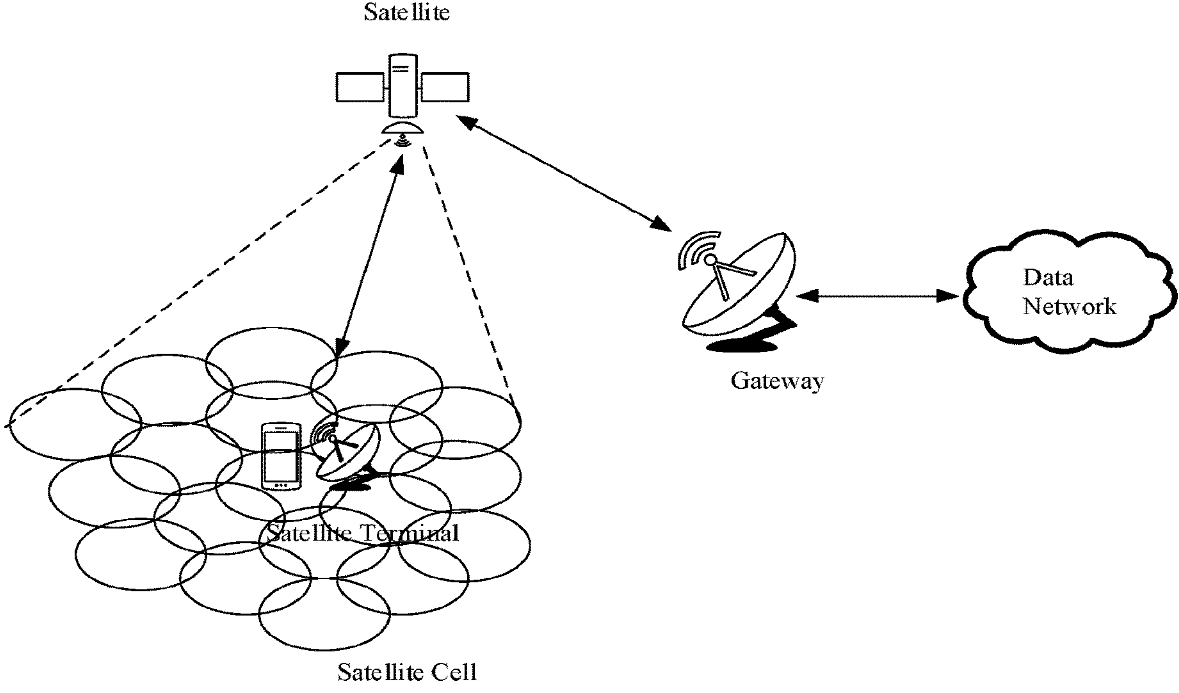
FIG. 1 illustrates a structural diagram of a communication system according to an example.

Exemplary embodiments will be described in detail here with the examples thereof expressed in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The random access methods provided by the examples of the present disclosure are applicable to a satellite communication system. FIG. 1 illustrates a structural diagram of a satellite communication system according to an example. As illustrated in FIG. 1, a satellite transmits beams through an antenna to form one or more satellite cells covered by a satellite network. The satellite is in a moving state, and a coverage range of the satellite network also changes with the movement of the satellite. A satellite cell may also be called a Beam foot print. Coverage areas of various satellite cells may be non-overlapped, partially overlapped, or completely overlapped. A satellite terminal may be deployed within the coverage range of the satellite network. The satellite terminal located within the coverage range of the satellite network communicates through a service link between the satellite cell and the satellite. The satellite communicates with a ground infrastructure, such as a gateway, through a feeder link, thereby realizing an interactive communication with a ground communication network, such as a core network and a data network.

The satellite terminal involved in example of the present disclosure may include, but be not limited to, a cellular and/or satellite radiotelephone with or without a multi-line displayer, a personal communication system (PCS) terminal integrating a radiotelephone, a data processing, a fax and/or a data communication capability together, a personal digital assistant (PDA) including a radio frequency transceiver and pager, an Internet/Intranet access, a web browser, a manager, a calendar and/or a global positioning system (GPS) receiver, and/or another device including the radio frequency transceiver. The satellite terminal involved in the examples of the present disclosure is sometimes referred to as a radiophone or a terminal, or may also be referred to as a terminal device, a user equipment (UE), a mobile station (MS), a mobile terminal (MT), etc.

Figure 2:
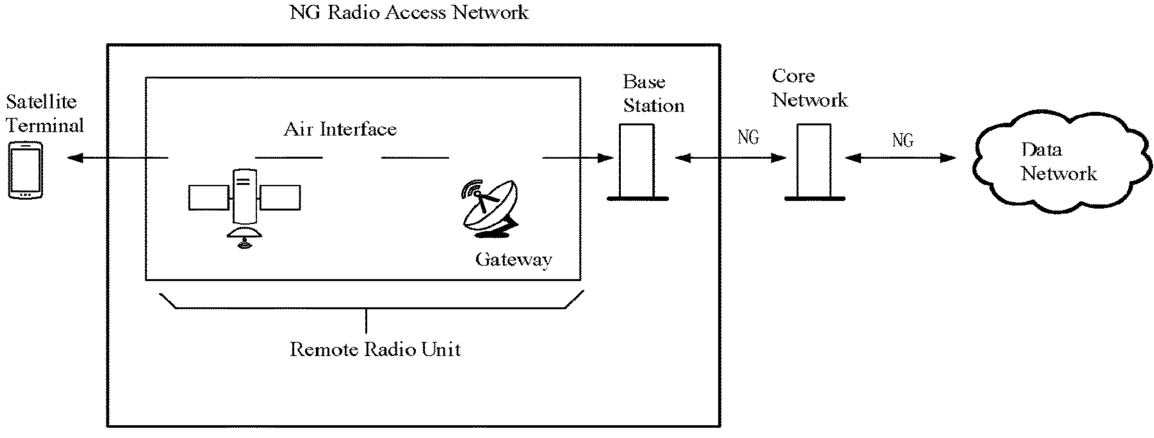
FIG. 2 illustrates a structural diagram of a communication system according to an example.
Figure 3:
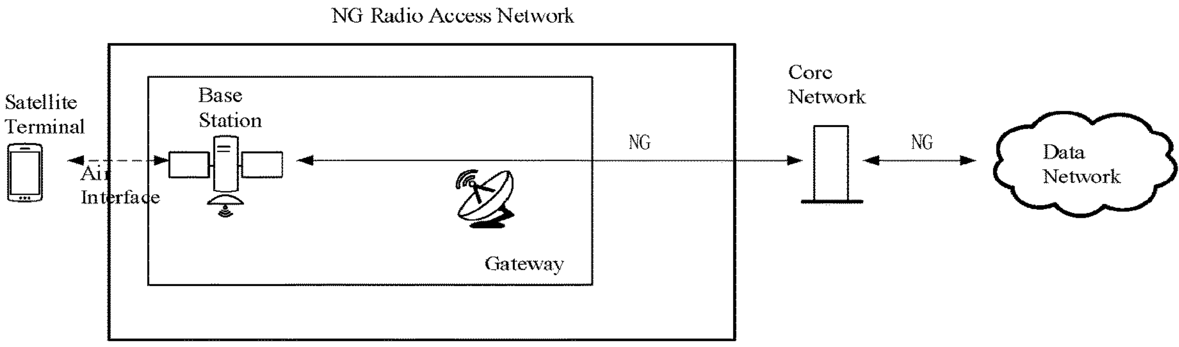
FIG. 3 illustrates a structural diagram of a communication system according to an example.

In an instance, one or more infrastructure units, such as a base station, are also deployed in the satellite communication system. FIG. 2 and FIG. 3 illustrate an architecture diagram of a satellite communication system deployed with a base station separately according to an example of the present disclosure. In FIG. 2, the base station (e.g., a gNB in a 5G network) is independent from a satellite and a gateway in a remote radio unit. The satellite terminal accesses the base station through a radio interface Uu, such as a new radio (NR) Uu, and is connected to the core network and the data network through an NG interface for communication. The base station, the satellite and the gateway may be understood as a next generation (NG) radio access network (RAN). In FIG. 3, the base station (e.g., the gNB in the 5G network) may be deployed together with the satellite, and combined with the gateway to form the NG RAN. The satellite terminal is connected to the base station through an air interface, and is connected to the core network and the data network through the NG interface for communication.

At present, a quantity of the satellites launched is still relatively small, which leads to a fact that the coverage of the satellite network is not continuous, but changes with the movement of communication satellites. Meanwhile, in a traditional terrestrial communication system, the base station is fixed and has a continuous coverage. A random access configuration of every satellite cell changes due to the discontinuity and mobility of the coverage of the satellite network, which makes it an urgent problem for the satellite terminal to access the satellite cell for communication.

The examples of the present disclosure provide a random access method, in which the satellite determines and sends the random access configurations of various satellite cells within the coverage of the satellite network. When performing a satellite cell access, the satellite terminal may determine the random access configurations of the satellite cells and select a satellite cell whose random access configuration matches the current random access, so that the satellite terminal can access the satellite cell for communication.

Figure 4:
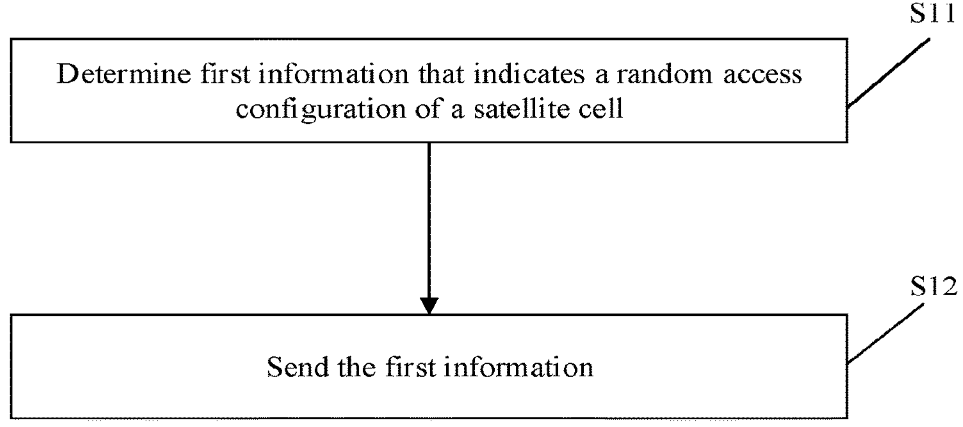
FIG. 4 illustrates a flowchart of a random access method according an example.

FIG. 4 illustrates a flowchart of a random access method according to an example. As illustrated in FIG. 4, the random the access method is applicable to a satellite and includes the following steps.

At step S11, first information is determined. The first information indicates a random access configuration of a satellite cell.

At step S12, the first information is sent.

In the example of the present disclosure, by determining and sending the random access configuration of the satellite cell, a satellite terminal can access the satellite cell for communication.

In the example of the present disclosure, as the satellite moves, the random access configurations corresponding to the satellite cells at different locations may be different. For example, the satellite cells at different locations may be configured with the random access configurations representing different terminal types or different service types. In other words, the random access configurations may be determined based on the terminal type, or may be determined based on the service type, or may also be determined based on both the terminal type and the service type. As an example, Satellite Cell 1 at Location A may be a cell supporting an Internet of Things (IoT) service, and its random access configuration may support an IoT terminal and/or an IoT service. Satellite Cell 1 at Location B may be a cell supporting an Internet service, and its random access configuration may support the Internet service. As another example, Satellite Cell 2 at Location C may be a cell supporting a voice communication service, and its random access configuration may support the voice service.

In one implementation of the example of the present disclosure, there is an association relationship between the random access configuration of each satellite cell and the location of the satellite cell. Through the association relationship, the random access configurations corresponding to the satellite cells at different locations may be indicated.

In one implementation of the example of the present disclosure, the location of each satellite cell may be determined based on an orbit of a satellite, and therefore, the association relationship between the random access configuration of the satellite cell and the location of the satellite cell may be determined based on the orbit of the satellite.

In one implementation of the example of the present disclosure, the association relationship between the random access configuration of each satellite cell and the location of the satellite cell may be determined by a base station.

In the example of the present disclosure, the association relationship determined by the base station may be sent to the satellite through a feeder link. The satellite receives the association relationship determined by the base station through the feeder link. The feeder link may be implemented based on an NR technology.

In the example of the present disclosure, for each satellite cell, the corresponding random access configuration of the satellite cell is separately set. For example, in an instance, the random access configuration of each satellite cell is associated with the location of the satellite cell. For example, different satellite cells at different locations may be configured to represent different types of terminals or different types of services. In one implementation, the association relationship between the random access configuration of each satellite cell and the location of the satellite cell may be determined based on the orbit of the satellite. Thus, in the example of the present disclosure, there is a correspondence relationship between the random access configuration of each satellite cell and the satellite cell. After determining the random access configuration of the satellite cell, the satellite may send the random access configuration of the satellite cell through an antenna. In addition, for each of different satellite cells, the random access configuration corresponding to the satellite cell may be sent.

Figure 5:
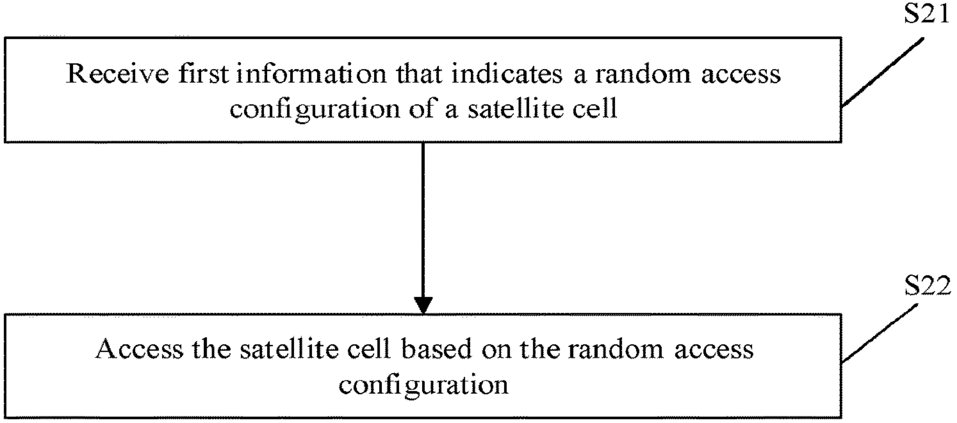
FIG. 5 illustrates a flowchart of a random access method according an example.

FIG. 5 illustrates a flowchart of a random access method according to an example. As illustrated in FIG. 5, the random access method is applicable to a satellite terminal and includes the following steps.

At step S21, first information is received. The first information indicates a random access configuration of a satellite cell.

At step S22, the satellite cell is accessed based on the random access configuration.

In the example of the present disclosure, the satellite terminal receives the random access configuration of the satellite cell, and based on the random access configuration, accesses the satellite cell for communication.

In one implementation of the example of the present disclosure, the random access configuration of the satellite cell may be determined based on a terminal type, or may be determined based on a service type, or may be determined based on a terminal type and a service type.

During accessing the satellite cell based on the random access configuration of the satellite cell for communication, the satellite terminal may first detect, based on the terminal type, the random access configurations sent by various satellite cells, and select the satellite cell with the random access configuration matching the terminal type for access, so as to access the satellite cell corresponding to the random access configuration matching the terminal type for communication.

In another implementation of the example of the present disclosure, during accessing the satellite cell for communication based on the random access configuration of the satellite cell, the satellite terminal may first detect the random access configurations sent by various satellite cells based on the service type of a service to be performed by the satellite terminal, and select the satellite cell with the random access configuration matching the service type for access, so as to access the satellite cell corresponding to the random access configuration matching the service type of the service to be performed by the terminal for communication.

In another implementation of the example, during accessing the satellite cell for communication based on the random access configuration of the satellite cell, the satellite terminal may first detect the random access configurations sent by various satellite cells based on the service type of a service to be performed by the satellite terminal and the terminal type, and select the satellite cell with the random access configuration matching both the terminal type and the service type for access, so as to access the satellite cell corresponding to the random access configuration matching both the terminal type and the service type of the service to be performed by the terminal for communication.

In an instance, when the satellite terminal is expected to access a satellite cell covered by a certain satellite, it is to check the first information sent by various satellite cells, and then select an appropriate satellite cell for access. For example, when Satellite Cell 1 is a cell supporting an Internet of Things service, and Satellite Cell 2 is a cell supporting an Internet service, an Internet of Things satellite terminal selects Satellite Cell 1 for access.

In the example of the present disclosure, there is an association relationship between the random access configuration of each satellite cell and the location of the satellite cell.

In one implementation, the association relationship between the random access configuration of the satellite cell and the location of the satellite cell be determined based on an orbit of a satellite.

In one implementation of the example of the present disclosure, there is a correspondence relationship between the random access configuration of the satellite cell and the satellite cell.

In one implementation of the example of the present disclosure, the association relationship between the random access configuration of the satellite cell and the location of the satellite cell may be determined by a base station.

In the example of the present disclosure, the association relationship determined by the base station may be sent to the satellite through a feeder link. The satellite receives the association relationship determined by the base station through the feeder link. The satellite sends to each satellite cell the corresponding association relationship between the random access configuration of the satellite cell and the location of the satellite cell through an antenna.

Figure 6:
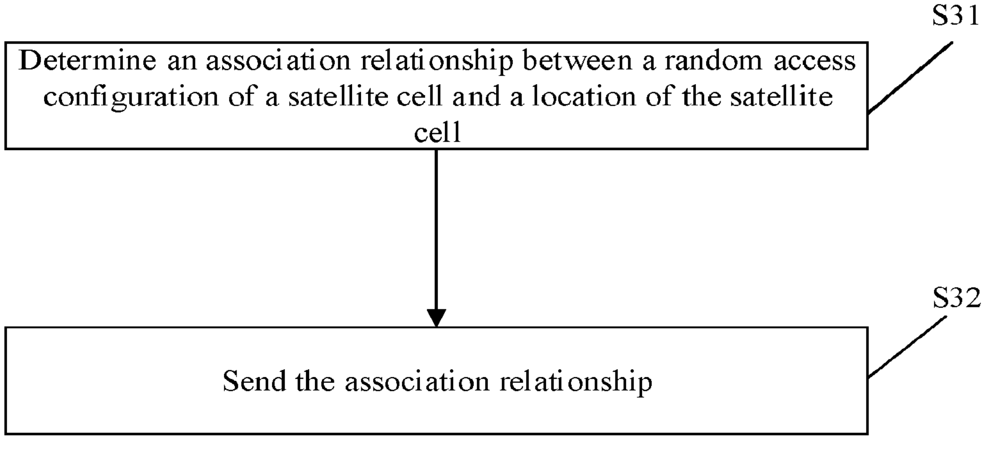
FIG. 6 illustrates a flowchart of a random access method according an example.

FIG. 6 illustrates a flowchart of a random access method according to an example. As illustrated in FIG. 6, the random access method is applicable to a base station and includes the following steps.

At step S31, an association relationship between a random access configuration of a satellite cells and a location of the satellite cell is determined.

At step S32, the association relationship is sent.

In one implementation, determining the association relationship between the random access configuration of the satellite cell and the location of the satellite cell includes determining the association relationship between the random access configuration of the satellite cell and the location of the satellite cell based on an orbit of a satellite.

In another implementation of the example of the present disclosure, the orbit of the satellite may be determined by the base station. The base station may send the determined orbit of the satellite to a satellite control center. In an instance, when deployed together with the satellite, the base station may determine the orbit of the satellite.

Alternatively, in the example of the present disclosure, the orbit of the satellite may be determined by the satellite control center. After determining the orbit of the satellite, the satellite control center may send the determined orbit of the satellite to the base station. The base station receives the orbit of the satellite.

In one implementation of the example of the present disclosure, after determining or receiving the orbit of the satellite, the base station may associate the random access configuration of each satellite cell with the location of the satellite cell based on the orbit of the satellite, and thus determine the association relationship between the random access configuration of the satellite cell and the location of the satellite cell.

In the example of the present disclosure, when associating the random access configuration of each satellite cell with the location of the satellite cell based on the orbit of the satellite, the base station may determine the random access configuration of each satellite cell based on a terminal type and/or a service type, so as to configure different satellite cells with the random access configures representing different terminal types or different service types.

In the example of the present disclosure, when determining the association relationship between the random access configuration of the satellite cell and the location of the satellite cell, the base station may determine the association relationship for each satellite cell separately, so that a correspondence relationship occurs between the random access configuration of the satellite cell and the satellite cell.

In the example of the present disclosure, after determining the association relationship between the random access configuration of the satellite cell and the location of the satellite cell, the base station may send the association relationship between the random access configuration of the satellite cell and the location of the satellite cell through a feeder link. For example, after associating the random access configuration of each satellite cell with the location of the satellite cell, the base station sends the association relationship of each satellite cell to the satellite through the feeder link. The feeder link may be implemented based on an NR technology.

In the example of the present disclosure, after receiving the association relationship sent by the base station, the satellite sends it through an antenna. For each of different satellite cells, the association relationship corresponding to the cell is sent. When a satellite terminal is expected to access a satellite cell covered by a certain satellite, it is to check the association relationships sent by various satellite cells first, and select an appropriate satellite cell for access. For example, when Satellite Cell 1 is a cell supporting an Internet of Things service, and Satellite Cell 2 is a cell supporting an Internet service, an Internet of Things satellite terminal selects Satellite Cell 1 for access.

In the random access method provided by the example of the present disclosure, the satellite determines and sends the random access configurations of various satellite cells within a coverage of a satellite network. When performing a satellite cell access, the satellite terminal may determine the random access configurations of the satellite cells and select a satellite cell with the random access configuration matching a current random access, so that the satellite terminal can access the satellite cell for communication.

The examples of the present disclosure also provide a random access apparatus based on the same conception.

It should be understood that the random access apparatus provided by the examples of the present disclosure includes corresponding hardware structures and/or corresponding software modules for performing various functions, so as to implement the above functions. By combining with units and algorithm steps disclosed in the examples of the present disclosure, the examples of the present disclosure may be implemented in hardware or in a combination form of hardware and computer software. Whether to perform a certain function in hardware or in a way of software-driven hardware is dependent on specific applications of a technical solution and design constraints. Those skilled in the art may adopt different schemes to implement the described functions for each specific application, which should not be considered beyond the scope of the technical solutions of the examples of the present disclosure.

Figure 7:
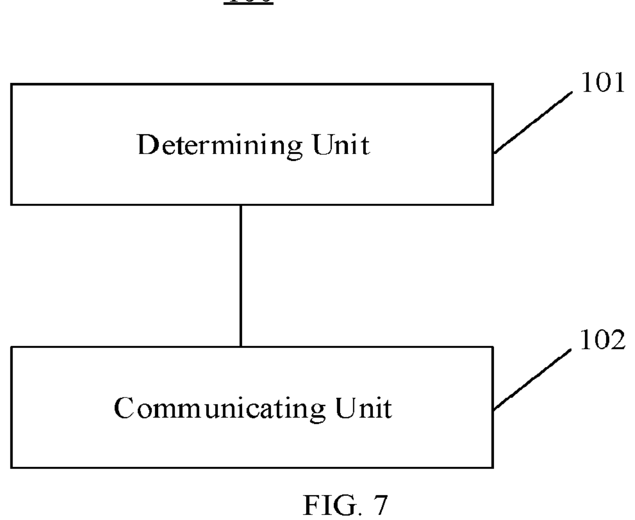
FIG. 7 illustrates a block diagram of a random access apparatus according to an example.

FIG. 7 illustrates a block diagram of a random access apparatus according to an example. As illustrated in FIG. 7, the random access apparatus 100 includes a determining unit 101 and a communicating unit 102.

The determining unit 101 is configured to determine first information that indicates a random access configuration of a satellite cell. The communicating unit 102 is configured to send the first information.

Alternatively or additionally, an association relationship occurs between the random access configuration of the satellite cell and a location of the satellite cell.

Alternatively or additionally, the association relationship is determined based on an orbit of a satellite.

Alternatively or additionally, the communicating unit is further configured to receive the association relationship through a feeder link.

Alternatively or additionally, the random access configuration is determined based on a terminal type and/or a service type.

Alternatively or additionally, a correspondence relationship occurs between the random access configuration of the satellite cell and the satellite cell.

Figure 8:
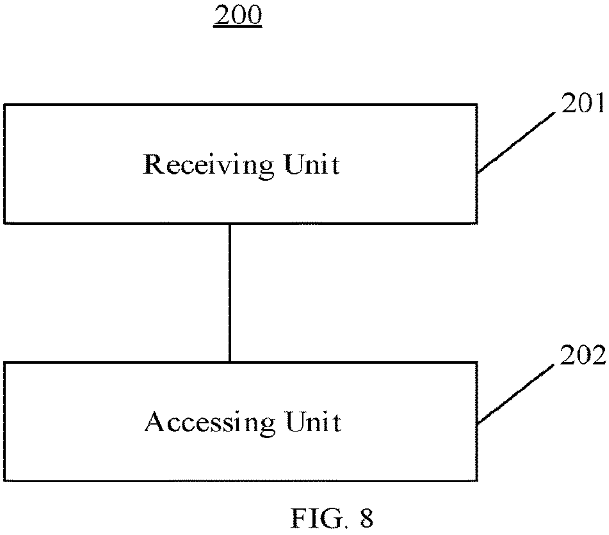
FIG. 8 illustrates a block diagram of a random access apparatus according to an example.

FIG. 8 illustrates a block diagram of a random access apparatus according to an example. As illustrated in FIG. 8, the random access apparatus 200 includes a receiving unit 201 and an accessing unit 202.

The receiving unit 201 is configured to receive first information that indicates a random access configuration of a satellite cell. The accessing unit 202 is configured to access the satellite cell based on the random access configuration.

Alternatively or additionally, an association relationship occurs between the random access configuration of the satellite cell and a location of the satellite cell.

Alternatively or additionally, the association relationship is determined based on an orbit of a satellite.

Alternatively or additionally, the random access configuration is determined based on a terminal type and/or a service type.

Alternatively or additionally, a correspondence relationship occurs between the random access configuration of the satellite cell and the satellite cell.

Alternatively or additionally, the accessing unit 202 is configured to access, based on a terminal type and/or a service type being performed, the satellite cell corresponding to the random access configuration that matches the terminal type and/or the service type.

Figure 9:
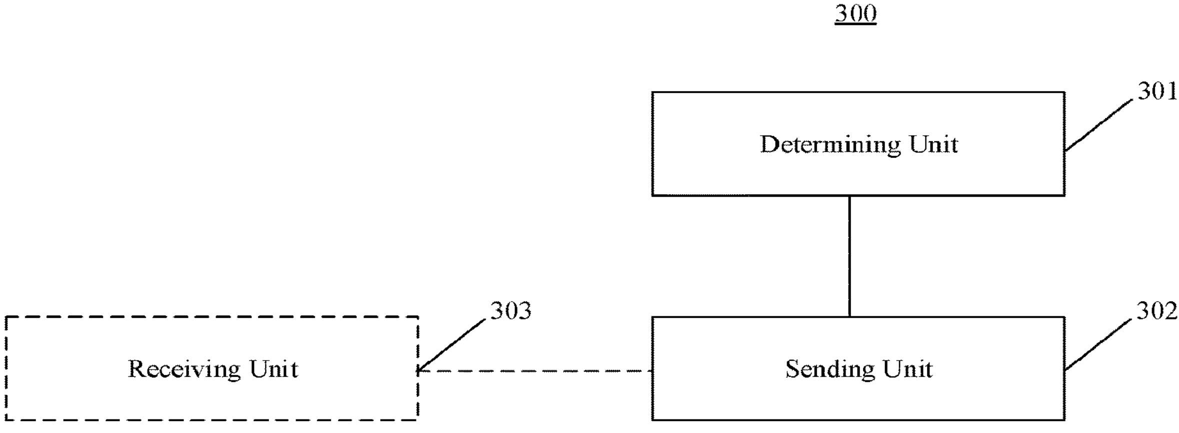
FIG. 9 illustrates a block diagram of a random access apparatus according to an example.

FIG. 9 illustrates a block diagram of a random access apparatus according to an example. As illustrated in FIG. 9, the random access apparatus 300 includes a determining unit 301 and a sending unit 302.

The determining unit 301 is configured to determine an association relationship between a random access configuration of a satellite cell and a location of the satellite cell. The sending unit 302 is configured to send the association relationship.

Alternatively or additionally, the determining unit 301 is configured to determine, based on an orbit of a satellite, the association relationship between the random access configuration of the satellite cell and the location of the satellite cell.

Alternatively or additionally, the determining unit 301 is further configured to determine the orbit of the satellite.

Alternatively or additionally, the random access apparatus 300 further includes a receiving unit 303 which is configured to receive the orbit of the satellite.

Alternatively or additionally, the sending unit 302 is configured to send the association relationship through a feeder link.

Alternatively or additionally, the random access configuration is determined based on a terminal type and/or a service type.

Alternatively or additionally, a correspondence relationship occurs between the random access configuration of the satellite cell and the satellite cell.

Regarding the apparatuses in the above examples, the specific ways in which each module performs its operations have been described in detail in the related method examples, and will not be repeated here.

Figure 10:
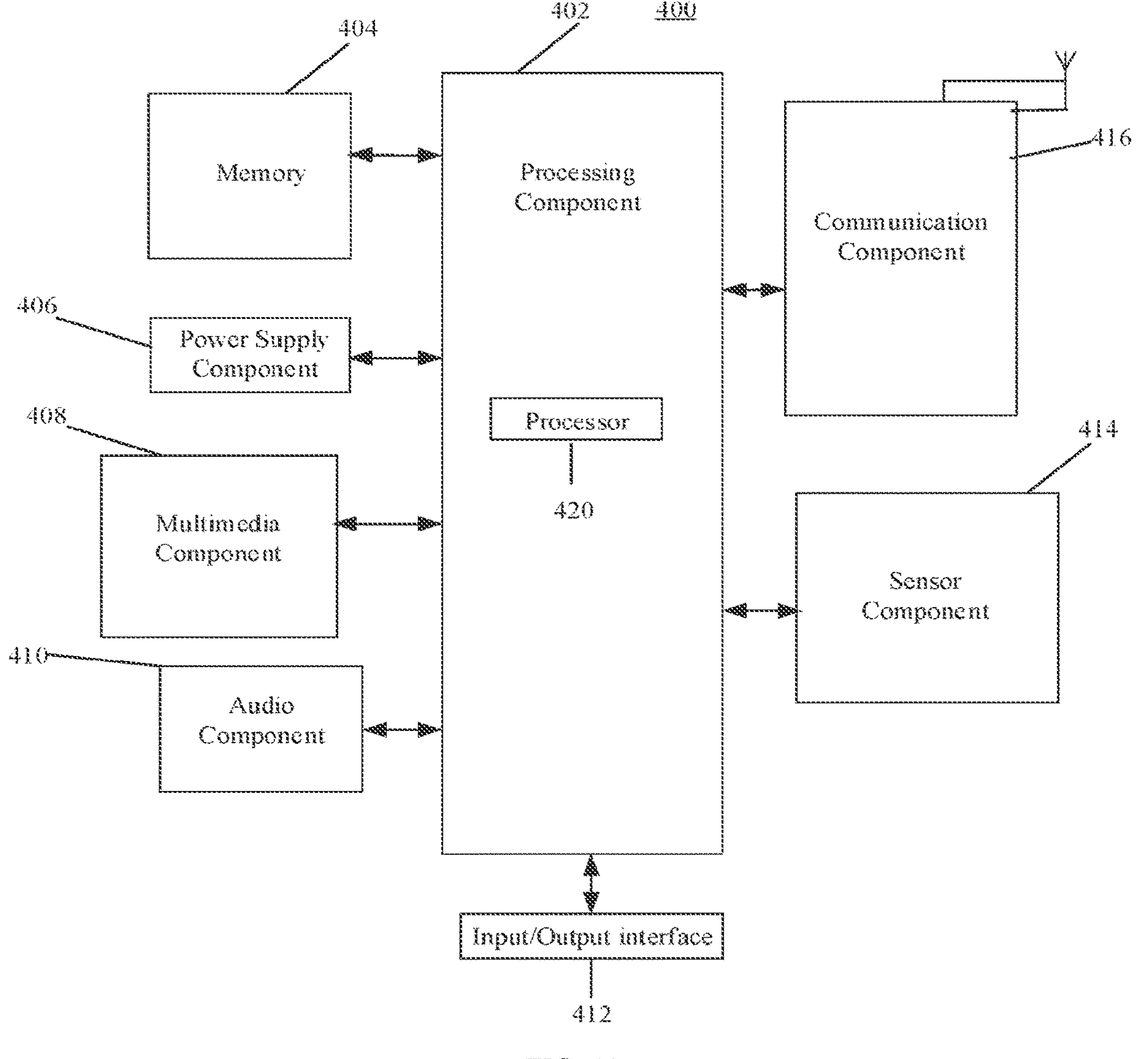
FIG. 10 illustrates a block diagram of an apparatus for a random access according to an example.

FIG. 10 illustrates a block diagram of an apparatus 400 for a random access according to an example. For example, the apparatus 400 may be a satellite terminal, such as a mobile phone, a computer, a digital broadcasting terminal, a messaging device, a game console, a tablet device, a medical device, a fitness device, and a personal digital assistant.

As illustrated in FIG. 10, the apparatus 400 may include one or more the following components: a processing component 402, a memory 404, a power supply component 406, a multimedia component 408, an audio component 410, an input/output (I/O) of interface 412, a sensor component 414, and a communication component 416.

The processing component 402 generally controls the overall operations of the apparatus 400, such as operations associated with display, phone calls, data communications, camera operations, and recording operations. The processing element 402 may include one or more processors 420 to execute instructions to complete all or part of the steps of the above methods. In addition, the processing component 402 may include one or more modules which facilitate the interaction between the processing component 402 and other components. For example, the processing component 402 may include a multimedia module to facilitate the interaction between the multimedia component 408 and the processing component 402.

The memory 404 is configured to store various types of data to support the operations of the apparatus 400. Examples of such data include instructions for any application or method operating on the apparatus 400, contact data, phone book data, messages, pictures, videos, and the like. The memory 404 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power supply component 406 provides power to various components of the apparatus 400. The power supply component 406 may include a power management system, one or more power supplies, and other components associated with generating, managing, and distributing power for the apparatus 400.

The multimedia component 408 includes a screen providing an output interface between the apparatus 400 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 408 includes a front camera and/or a rear camera. The front camera and/or rear camera may receive external multimedia data when the apparatus 400 is in an operating mode, such as a photographing mode or a video mode. Each front camera and rear camera may be a fixed optical lens system or have focal length and optical zooming capability.

The audio component 410 is configured to output and/or input an audio signal. For example, the audio component 410 includes a microphone (MIC) that is configured to receive an external audio signal when the apparatus 400 is in an operating mode, such as a call mode, a recording mode, and a voice recognition mode. The received audio signal may be further stored in memory 404 or transmitted via communication component 416. In some examples, the audio component 410 also includes a speaker for outputting an audio signal.

The I/O interface 412 provides an interface between the processing component 402 and a peripheral interface module. The above peripheral interface module may be a keyboard, a click wheel, buttons, or the like. These buttons may include but not limited to, a home button, a volume button, a start button and a lock button.

The sensor component 414 includes one or more sensors to provide the apparatus 400 with status assessments in various aspects. For example, the sensor component 414 may detect the on/off status of the apparatus 400, and relative positioning of component, for example, the component is a display and a keypad of the apparatus 400. The sensor component 414 may also detect a change in position of the apparatus 400 or a component of the apparatus 400, a presence or absence of the contact between a user and the apparatus 400, an orientation or an acceleration/deceleration of the apparatus 400, and a change in temperature of the apparatus 400. The sensor component 414 may include a proximity sensor configured to detect the presence of a nearby object without any physical contact. The sensor component 414 may further include an optical sensor, such as a complementary metal-oxide-semiconductor (CMOS) or charged coupled device (CCD) image sensor which is used in imaging applications. In some examples, the sensor component 414 may also include an acceleration sensor, a gyro sensor, a magnetic sensor, a pressure sensor, or a temperature sensor.

The communication component 416 is configured to facilitate wired or wireless communication between the apparatus 400 and other devices. The apparatus 400 may access a wireless network based on any communication standard, such as WiFi, 2G or 3G, or a combination thereof. In an example, the communication component 416 receives broadcast signals or broadcast related information from an external broadcast management system via a broadcast channel. In an example, the communication component 416 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the apparatus 400 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above methods.

In some examples, there is also provided a non-transitory computer-readable storage medium including instructions, such as the memory 404 including instructions. The above instructions may be executed by the one or more processors 420 of the apparatus 400 to complete the above methods. For example, the non-transitory computer-readable storage medium may be a read only memory (ROM), a random access memory (RAM), a CD-ROM, a magnetic tape, a floppy disk, an optical data storage device, and the like.

Figure 11:
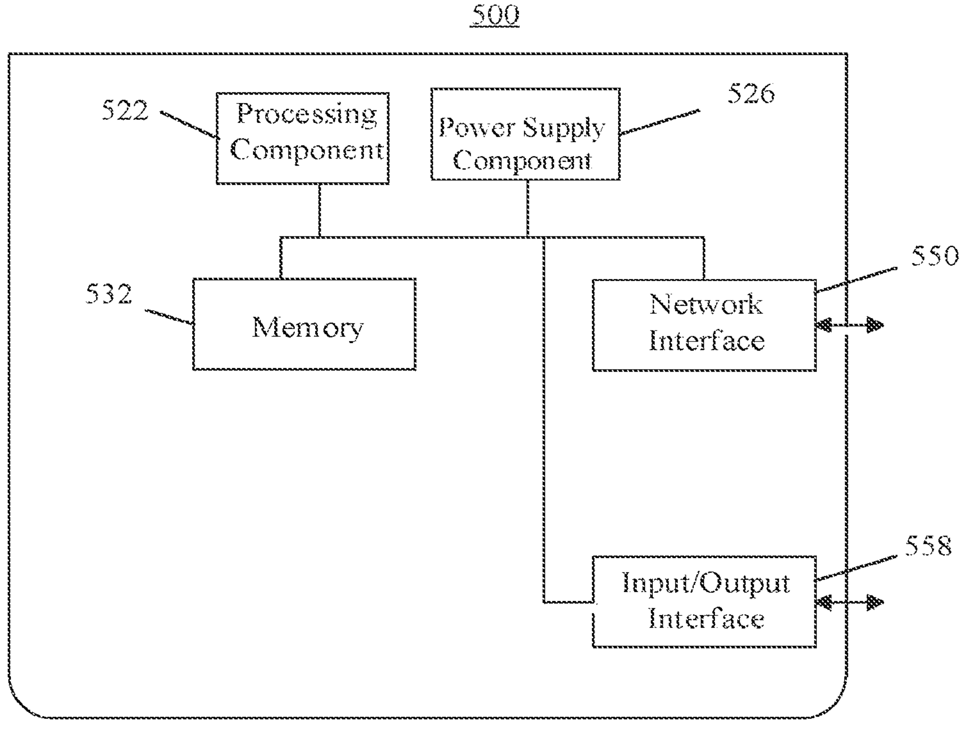
FIG. 11 illustrates a block diagram of an apparatus for a random access according to an example.

FIG. 11 illustrates a block diagram of an apparatus 500 for a random access according to an example. For example, the apparatus 500 may be provided as a satellite or a base station. As illustrated in FIG. 11, the apparatus 500 includes a processing component 522 which further includes one or more processors, and a memory resource represented by a memory 532 which is used to store instructions that can be executed by the processing component 522, such as application programs. The application programs stored in the memory 532 may include one or more modules, each of which corresponds to a set of instructions. In addition, the processing component 522 is configured to execute instructions to perform the above methods.

The apparatus 500 may also include a power supply component 526 configured to perform power management for the apparatus 500, a wired or wireless network interface 550 configured to connect the apparatus 500 to a network, and an input/output (I/O) interface 558. The apparatus 500 may operate based on an operating system stored in the memory 532, such as Windows Server™, Mac OS X™, Unix™, Linux™, FreeBSD™ or the like.

In one or more examples, there is also provided a non-transitory computer-readable storage medium including instructions, such as the memory 532 including instructions. The above instructions may be executed by the processing component 522 of the apparatus 500 to complete the above methods. For example, the non-transitory computer-readable storage medium may be an ROM, an RAM, a CD-ROM, a magnetic tape, a floppy disk, an optical data storage device, and the like.

The technical solutions provided by the present disclosure may include the following beneficial effects. By determining and sending a random access configuration of a satellite cell, a satellite terminal receives the random access configuration of the satellite cell, and accesses the satellite cell for communication based on the random access configuration.

It should be further understood that the term “plurality” in the present disclosure refers to two or above, and other quantifiers are similar. The term “and/or” describes the association relationships between associated objects, indicating that there may be three types of relationships. For example, A and/or B means that A exists alone, A and B exist at the same time, and B exists alone. The character “/” generally indicates that the associated objects before and after are in an “or” relationship. The singular forms “a”, “said” and “the” are also intended to include plurality, unless clearly indicated otherwise in the context.

It should be further understood that the terms “first”, “second”, etc. are used to describe various information, but such information should not be limited to these terms. These terms are only used to distinguish information of the same category with each other, without indicating a specific order or an importance. In fact, the expressions such as “first” and “second” may be used interchangeably. For example, without departing from the scope of the present disclosure, first information may be referred as second information; and similarly, second information may also be referred as first information.

It should be further understood that although being described in a specific order in the drawings, the operations in the examples of the present disclosure should not be understood as requiring these operations to be performed in the specific order or in a serial order as shown, or requiring the operations to be completely performed as shown to get a desired result. In certain circumstances, multitasking and parallel processing may be advantageous.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. An information sending method, performed by a satellite, comprising:

determining first information that indicates random access configurations of satellite cells, wherein an association relationship occurs between the random access configurations of the satellite cells and locations of the satellite cells, and wherein the locations of the satellite cells are determined based on an orbit of the satellite, the association relationship indicates the random access configurations corresponding to the satellite cells at different locations, the random access configurations corresponding to the satellite cells at different locations are different, and the satellite cells at different locations are configured with the random access configurations representing different terminal types or different service types; and sending the first information to a satellite terminal, so that the satellite terminal selects and accesses a satellite cell with a random access configuration matching a terminal type or a service type of the satellite terminal.

2. The information sending method according to claim 1, further comprising:

receiving the association relationship through a feeder link.

3. The information sending method according to claim 1, wherein each of the random access configurations is determined based on at least one of followings: a terminal type, or a service type.

4. An information receiving method, performed by a satellite terminal, comprising:

receiving, from a satellite, first information that indicates random access configurations of satellite cells, wherein an association relationship occurs between the random access configurations of the satellite cells and locations of the satellite cells, and wherein the locations of the satellite cells are determined based on an orbit of the satellite, the association relationship indicates random access configurations corresponding to the satellite cells at different locations, the random access configurations corresponding to the satellite cells at different locations are different, and the satellite cells at different locations are configured with the random access configurations representing different terminal types or different service types; and accessing, based on the random access configurations, a satellite cell with a random access configuration matching a terminal type or a service type of the satellite terminal.

5. The information receiving method according to claim 4, wherein accessing, based on the random access configurations, the satellite cell with the random access configuration matching the terminal type or the service type of the satellite terminal comprises:

accessing, based on at least one of a terminal type or a service type being performed, the satellite cell corresponding to the random access configuration that satisfies at least one of followings: matching the terminal type, or matching the service type.

6. An information sending method, performed by a base station, comprising:

determining locations of satellite cells based on an orbit of a satellite, wherein the satellite cells at different locations are configured with random access configurations representing different terminal types or different service types:

associating the random access configurations of the satellite cells with the locations of the satellite cells, and determining an association relationship between the random access configurations of the satellite cells and the locations of the satellite cells, wherein the association relationship indicates random access configurations corresponding to the satellite cells at different locations, the random access configurations corresponding to the satellite cells at different locations are different; and sending the association relationship to the satellite, so that the satellite determines and sends the random access configurations of the satellite cells, wherein the random access configurations of the satellite cells are configured for a satellite terminal to select and access a satellite cell with a random access configuration matching a terminal type or a service type of the satellite terminal.

7. The information sending method according to claim 6, further comprising:

determining, before determining the locations of the satellite cells based on the orbit of the satellite, the orbit of the satellite; or receiving, before determining the locations of the satellite cells based on the orbit of the satellite, the orbit of the satellite.

8. The information sending method according to claim 6, wherein sending the association relationship comprises:

sending the association relationship through a feeder link.

9. The information sending method according to claim 6, wherein each of the random access configurations is determined based on at least one of followings: a terminal type, or a service type.

10. An information sending apparatus, comprising:

one or more processors; and a memory for storing instructions executable by the one or more processors;

wherein the one or more processors are configured to perform the information sending method according to claim 1.

11. An information receiving apparatus, comprising:

one or more processors; and a memory for storing instructions executable by the one or more processors;

wherein the one or more processors are configured to perform the information receiving method according to claim 7.

12. An information sending apparatus, comprising:

one or more processors; and a memory for storing instructions executable by the one or more processors;

wherein the one or more processors are configured to perform the information sending method according to claim 6.

* * * * *